(12) United States Patent
Chowdhury et al.

(10) Patent No.: US 11,567,505 B2
(45) Date of Patent: Jan. 31, 2023

(54) INCYCLE PLANNER CHECKOUT FOR AUTONOMOUS VEHICLES

(71) Applicant: Caterpillar Inc., Peoria, IL (US)

(72) Inventors: Sagar Chowdhury, Peoria, IL (US); Matthew D. Johnson, Dunlap, IL (US); Joshua C. Struble, Chillicothe, IL (US); Philip Wallstedt, Washington, IL (US); Bryan J. Everett, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 16/553,573

(22) Filed: Aug. 28, 2019

(65) Prior Publication Data
US 2021/0064049 A1    Mar. 4, 2021

(51) Int. Cl.
| | |
|---|---|
| *G05D 1/02* | (2020.01) |
| *B60W 50/02* | (2012.01) |
| *B60W 50/04* | (2006.01) |
| *E02F 9/20* | (2006.01) |
| *E02F 9/26* | (2006.01) |
| *B60W 50/00* | (2006.01) |

(52) U.S. Cl.
CPC ....... *G05D 1/0223* (2013.01); *B60W 50/0205* (2013.01); *B60W 50/04* (2013.01); *E02F 9/2054* (2013.01); *E02F 9/265* (2013.01); *G05D 1/0272* (2013.01); *B60W 2050/007* (2013.01); *B60W 2050/0215* (2013.01); *B60W 2050/041* (2013.01); *G05D 2201/0202* (2013.01)

(58) Field of Classification Search
CPC ............... G05D 1/0223; G05D 1/0272; G05D 2201/0202; G05D 1/02; B60W 50/0205; B60W 50/04; B60W 2050/007; B60W 2050/0215; B60W 2050/041; E02F 9/2054; E02F 9/265; E02F 9/205; E02F 9/268; E02F 9/20
See application file for complete search history.

(56) References Cited

U.S. PATENT DOCUMENTS

| | | | |
|---|---|---|---|
| 8,612,084 B2 | 12/2013 | Hennessy et al. | |
| 9,008,886 B2 | 4/2015 | Braunstein et al. | |
| (Continued) | | | |

FOREIGN PATENT DOCUMENTS

| | | |
|---|---|---|
| CN | 107843440 A | 3/2018 |
| CN | 108762240 A | 11/2018 |
| (Continued) | | |

*Primary Examiner* — Aniss Chad
*Assistant Examiner* — Christopher George Fees
(74) *Attorney, Agent, or Firm* — Xsensus LLC

(57) ABSTRACT

Process for clearing an autonomous machine including first evaluating operation at a high curvature offline location. Following acceptable operation, the machine is placed into service and evaluated at a worksite. Following acceptable worksite operation, online operating speed of the machine is increased incrementally, and performance reevaluated. Following acceptable performance characteristics, online operating speed of the machine continues to be increased and revaluated until the machine reaches maximum designated operating speed, or is evaluated as unacceptable, in which case the machine continues to operate at the last acceptable online operating speed and identifies the unacceptable performance characteristic for further evaluation.

20 Claims, 6 Drawing Sheets

(56) References Cited

U.S. PATENT DOCUMENTS

| | | | |
|---|---|---|---|
| 9,182,760 B2 | 11/2015 | Braunstein et al. | |
| 2001/0021888 A1 | 9/2001 | Burns et al. | |
| 2014/0163773 A1* | 6/2014 | Braunstein | E02F 9/205 |
| | | | 701/2 |
| 2014/0196919 A1* | 7/2014 | Kowalchuk | A01B 63/32 |
| | | | 701/50 |
| 2018/0208058 A1* | 7/2018 | Czapka | A01C 21/00 |
| 2019/0001989 A1* | 1/2019 | Schoenfeld | B60W 50/0225 |
| 2020/0338741 A1* | 10/2020 | Voorhies | G01C 22/00 |

FOREIGN PATENT DOCUMENTS

| | | |
|---|---|---|
| CN | 109632333 A | 4/2019 |
| JP | 3262102 B2 | 3/2002 |

\* cited by examiner

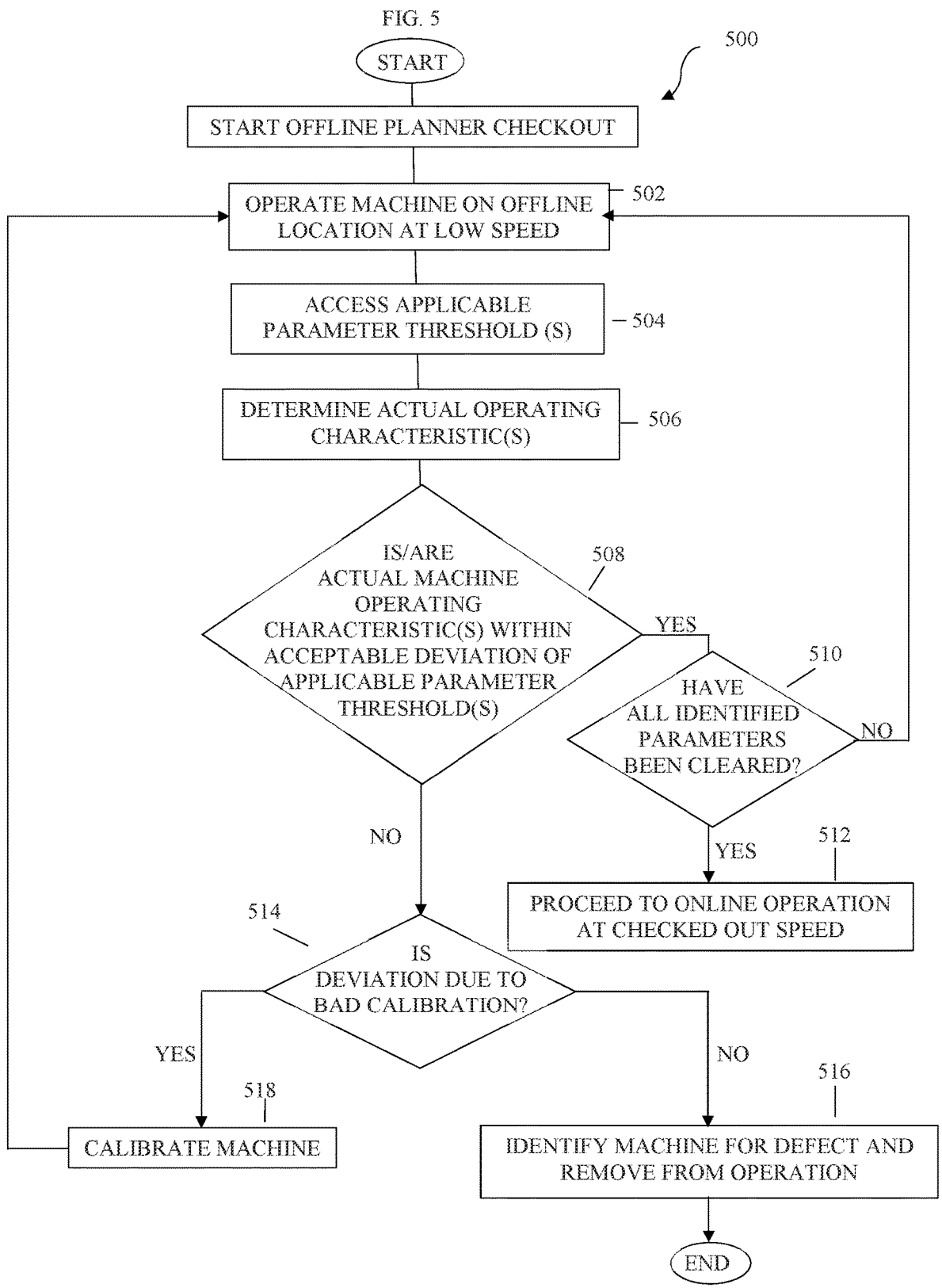

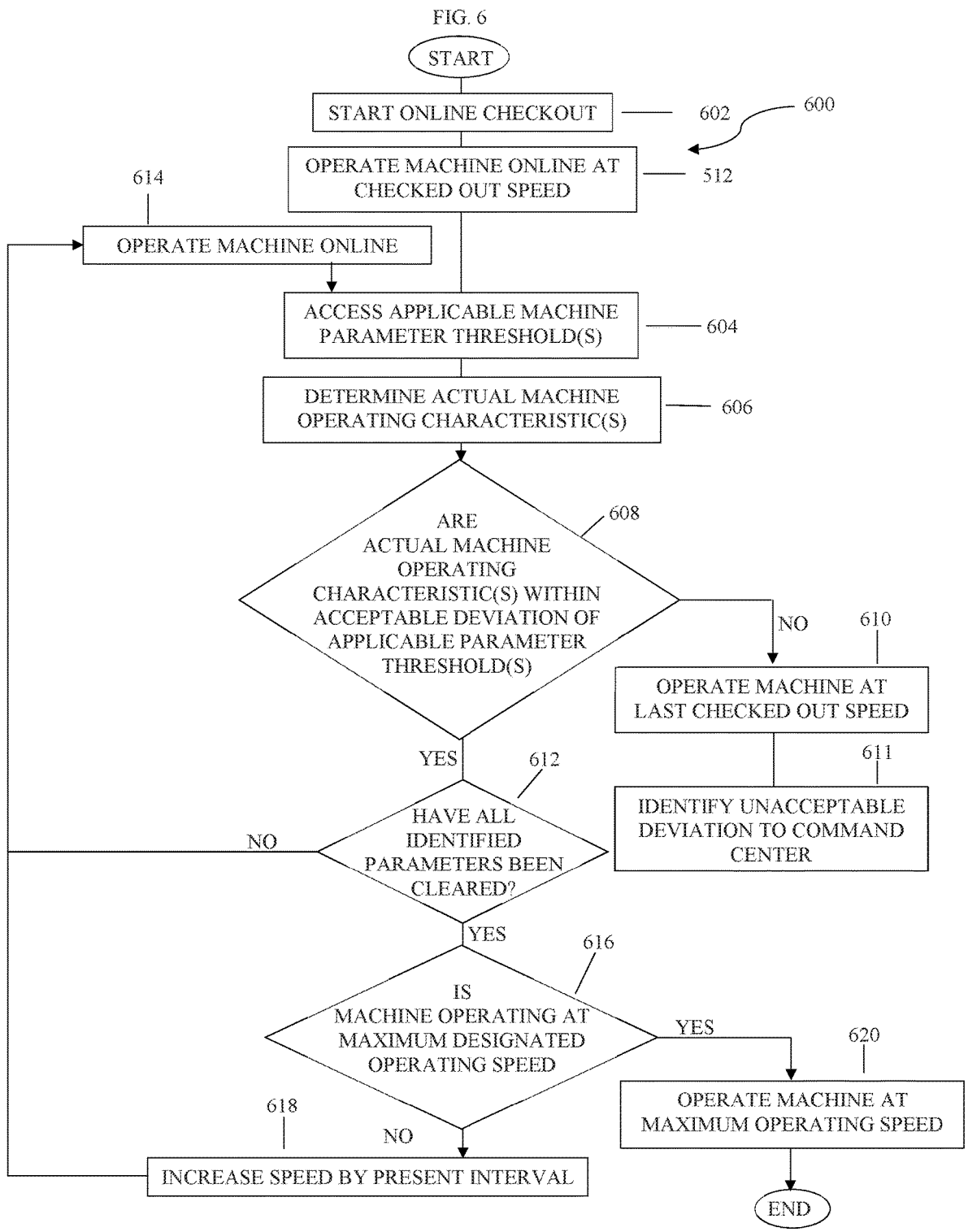

INCYCLE PLANNER CHECKOUT FOR AUTONOMOUS VEHICLES

TECHNICAL FIELD

The present disclosure relates generally to a method of clearing an autonomous vehicle for operation, and, more particularly, to a method of clearing an autonomous vehicle for operation while minimizing downtime.

BACKGROUND

Autonomous worksites are designed to provide productivity gains through more consistency in processes. Such worksites may employ a plurality of autonomous machines such as, for example, off-highway haul trucks, motor graders, and other types of heavy equipment to perform a variety of tasks. Primary operation of such machines may be controlled by a combination of on-board and off-board computers, processors, and other electronic controllers rather than human operators. As a result, autonomous operation may enhance the productivity of the machines, and reduce the human resources required for controlling the operation of the work-site.

To operate the autonomous machines safely and efficiently on the worksite, the machines are usually equipped with sensors for detecting objects on the worksite. For example, RADAR (radio detection and ranging) sensors, SONAR (sound navigation and ranging) sensors, LIDAR (light detection and ranging) sensors, IR (infrared) and non-IR cameras, and other similar sensors may be used. The sensed objects may include specific geographical features of the worksite (for example, berms, markers, rocks, etc.), the other machines on the worksite, and any obstructions on the worksite. The machines are also generally equipped with sensors for detecting information regarding characteristics of the machine itself (for example, engine speed, travel and/or work speed, steering angle, transmission gear or gear ratio, orientation such as pitch and roll, geographical location, load weight, and load distribution). A vehicle model, which is a computer model that is used in autonomous operation of the machine on the worksite, may be stored in a computer memory of the machine.

On-board controller may cause machine to autonomously follow a route generated by a path planner associated with worksite. Upon introduction of a machine at a worksite or reintroduction of a machine at a worksite following repair or service, it may be necessary to evaluate machine operation in order to ensure that the machine satisfactorily follows a route generate by the path planner. This procedure is often referred to as a planner checkout. Should the machine not pass an applicable planner checkout, further calibration or removing the machine from operation may be required.

To perform planner checkout or calibration of the vehicle model, the autonomous machine may undergo a series of specific tests. The tests measure the actual performance of the machine under a variety of conditions, including different loads, speeds, steering angles, and orientations of the machine. After the conclusion of the testing, the actual performance of the machine under the various conditions is compared to the performance that was predicted by the standard vehicle model under those same conditions.

The area required for effective planner checkout or calibration-related activity may be relatively large. As a result, autonomous worksites may not have the physical space to set aside a dedicated area for complete test related activity. When an autonomous machine goes through assembly or repair at an autonomous worksite, the machine is often transported to an area designated specifically for planner checkout or calibration-related activity. The designated area may be a significant distance from the autonomous worksite. Further, it may take a significant amount of time to complete all of the specific tests required for complete planner checkout of the vehicle model. Thus, the autonomous machine may not be available to perform any task on the autonomous worksite for a relatively long period of time, until the machine is completely calibrated and has passed an applicable planner checkout, at which time the autonomous machine is transported back to the worksite. Subsequent service of the machine may result in similar disadvantages, since it may be necessary to transport the autonomous machine back to the designated area to again undergo the series of specific tests associated with the planner checkout, and calibration, if necessary.

A method of modifying a worksite a method of managing a worksite to facilitate calibration-related activity are described in U.S. Pat. Nos. 9,008,886 and 9,182,760 to Braunstein et al. The Braunstein patents discloses methods designing a haul road to accommodate the calibration process and directing the machine to particular portions of a worksite that include characteristic for calibration.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The disclosure may provide a system and process for clearing a machine for operation at an autonomous worksite or a semiautonomous worksite, including two separate steps. The machine is first operated at an offline operating speed and evaluated for operation on a high curvature offline location to determine a checked out offline speed. If the machine is evaluated as exhibiting acceptable offline operating characteristics, the machine is placed into service online at a worksite. If the machine is evaluated as not exhibiting acceptable online operating characteristics, the machine continues to be operated online at the checked out offline speed. If the machine is evaluated as exhibiting acceptable online operating characteristics, an online operating speed of the machine is increased incrementally, and the machine is evaluated again while in service online. If the machine is evaluated as exhibiting acceptable online operating characteristics at the increased online operating speed, the online operating speed of the machine is again increased incrementally and the online operating characteristics are evaluated again while in service online. This process continues until the machine is either cleared to operate at a maximum designated operating speed, or the machine is evaluated as not exhibiting acceptable online operating characteristics, in which case the machine continues to be operated at the last online operating speed that provides acceptable online operating characteristics.

More specifically, the disclosure may provide a system for clearing a machine for at least one of autonomous operation and semiautonomous operation at an autonomous worksite. The system includes an offline location including a plurality of predetermined curves, the offline location not including the autonomous worksite; at least one sensor configured to measure at least two operating characteristics of the machine, the at least two operation characteristics including at least an offline operating characteristic and an online operating characteristic; and a control system including at least one controller. The at least one controller is configured to store a reference profile for the machine, store operational parameters based upon the reference profile, the operational parameters including at least one predetermined offline parameter threshold and at least one predetermined online parameter threshold, and access the at least two operating characteristic of the machine from the at least one sensor. The at least one controller is further configured to conduct an offline planner checkout procedure and conduct an online planner checkout procedure. According to the offline planner checkout procedure, the at least one controller is configured to operate the machine at the offline location at an offline operating speed; determine whether the at least one offline operating characteristic is within the at least one predetermined offline parameter threshold or an acceptable offline deviation therefrom; and if the offline operating characteristic is within the predetermined offline parameter threshold or the acceptable offline deviation therefrom, identify the slow speed as a checked out offline speed. According to the online planner checkout, the at least one controller is configured to operate the machine at the autonomous worksite at an online operating speed that is at least as great as the checked out offline speed; determine whether the at least one online operating characteristic is within the at least one predetermined online parameter threshold or an acceptable online deviation therefrom; if the online operating characteristic is not within the at least one predetermined online parameter threshold or an acceptable online deviation therefrom, operate the machine at the autonomous worksite at the checked out offline speed; if the at least one online operating characteristic is within the predetermined online parameter threshold or the acceptable online deviation therefrom, identify the online operating speed as a checked out online speed, determine if the machine is operating at a maximum designated operating speed, and if the machine is not operating at the maximum designated operating speed, increase the online operating speed of the machine by a preset interval and repeat the online planner checkout procedure, designating an increased online operating speed as the online operating speed.

The disclosure may also provide a method of clearing a machine for at least one of autonomous operation and semiautonomous operation at an autonomous worksite. The method includes conducting an offline planner checkout procedure and, if the machine performs acceptably in the offline planner checkout procedure, conducting an online planner checkout. The method according to the offline planner checkout procedure includes operating the machine at an offline location at an offline operating speed, the offline location including a plurality of predetermined curves, the offline location not including the autonomous worksite; determining at least one offline operating characteristic of the machine from at least one sensor; determining whether the at least one offline operating characteristic is within a predetermined offline parameter threshold or an acceptable offline deviation therefrom; and if the at least one offline operating characteristic is within the predetermined offline parameter threshold or the acceptable offline deviation therefrom, identifying the slow speed as an checked out offline speed. The method according to the online planner checkout procedure includes operating the machine at the autonomous worksite at an online operating speed that is at least as great as the checked out speed; determining at least one online operating characteristic of the machine from the at least one sensor; accessing at least one online operational parameter corresponding to the at least one online operating characteristic of the machine; determining whether the at least one online operating characteristic is within a predetermined online parameter threshold or an acceptable online deviation therefrom; if the at least one online operating characteristic is not within the predetermined online parameter threshold or the acceptable online deviation therefrom, operating the machine at the autonomous worksite at the checked out speed; and if the at least one online operating characteristic is within the predetermined online parameter threshold or the acceptable online deviation therefrom, identifying the online operating speed as an checked out online speed, determining if the machine is operating at a maximum designated operating speed, and if the machine is operating at the maximum designated operating speed, ending the online planner checkout procedure and continuing to operate the machine at the autonomous worksite at the maximum designated operating speed, or, if the machine is not operating at the maximum designated operating speed, increasing the online operating speed of the machine by a preset interval and repeating the online planner checkout procedure, and designating an increased online operating speed as the online operating speed.

The disclosure may further provide a machine including a body, a drive system including a prime mover operatively connected to at least one ground engaging drive mechanism, at least one pose sensor disposed to provide data indicative of machine pose, and a machine control system including at least one controller. The at least one controller is configured to store operational parameters based upon a reference profile for the machine; conduct an offline planner checkout procedure, and conduct an online planner checkout procedure. According to the offline planner checkout procedure, the at least one controller is configured to operate the machine at an offline operating speed at the offline location including a plurality of predetermined curves; determine at least one offline operating characteristic of the machine from the at least one pose sensor; access at least one offline operational parameter corresponding to the at least one offline operating characteristic of the machine; determine whether the at least one offline operating characteristic is within a predetermined offline parameter threshold or an acceptable offline deviation therefrom; and if the at least one offline operating characteristic is within the predetermined offline parameter threshold or the acceptable offline deviation therefrom, identify the slow speed as a checked out offline speed. According to the online planner checkout procedure, the at least one controller is configured to operate the machine at an autonomous worksite at an online operating speed that is at least as great as the checked out offline speed; determine at least one online operating characteristics of the machine from the at least one sensor; access at least one online operational parameter corresponding to the at least one online operating characteristic of the machine; determine whether the at least one online operating characteristic is within a predetermined online parameter threshold or an acceptable online deviation therefrom; and if the at least one online operating characteristic is not within the predetermined online parameter threshold or the acceptable online deviation therefrom, operate the machine at the autonomous worksite at the checked out offline speed; and if the at least one operating characteristic is within the predetermined online parameter threshold or the acceptable online deviation therefrom, identify the online operating speed as the checked out online speed, and determine if the machine is operating at a maximum designated operating speed; if the machine is operating at the maximum designated operating speed, end the online planner checkout procedure and continue to operate the machine at the autonomous worksite at maximum designated operating speed; and if the machine is not operating at the maximum designated operating speed, increase the online operating speed of the machine by a preset interval and repeat the online planner checkout procedure, designating an increased online operating speed as the online operating speed.

BRIEF DESCRIPTION OF THE DRAWING(S)

FIG. 5 is a flow chart illustrating an exemplary offline planner checkout system and procedure for the autonomous machine of FIG. 1; and FIG. 6 is a flow chart illustrating an exemplary online planner checkout system and procedure for the autonomous machine of FIG. 1.

DETAILED DESCRIPTION

Figure 1:
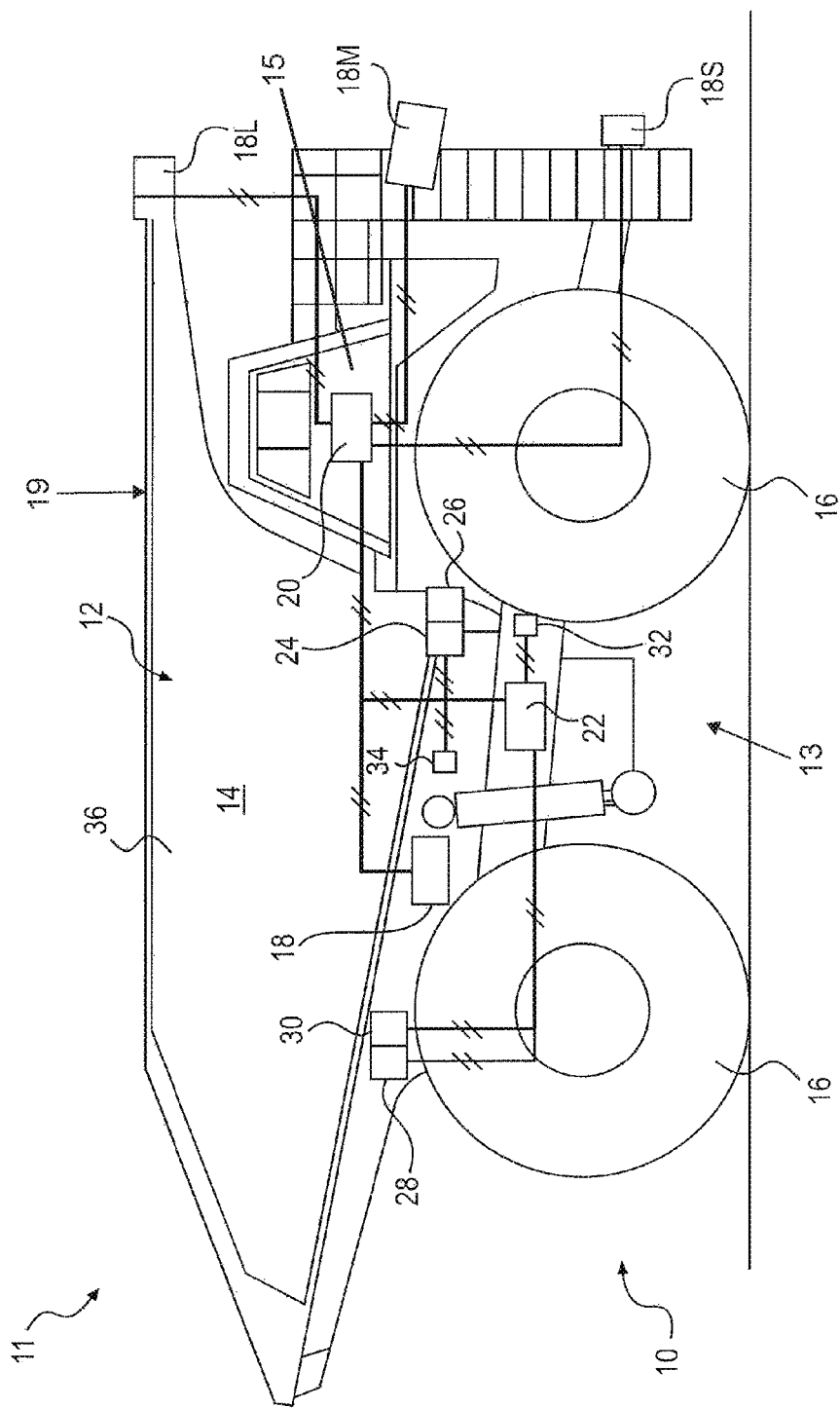
FIG. 1 is a side elevational view of an exemplary autonomous machine in which the principles disclosed herein may be utilized.
Figure 2:
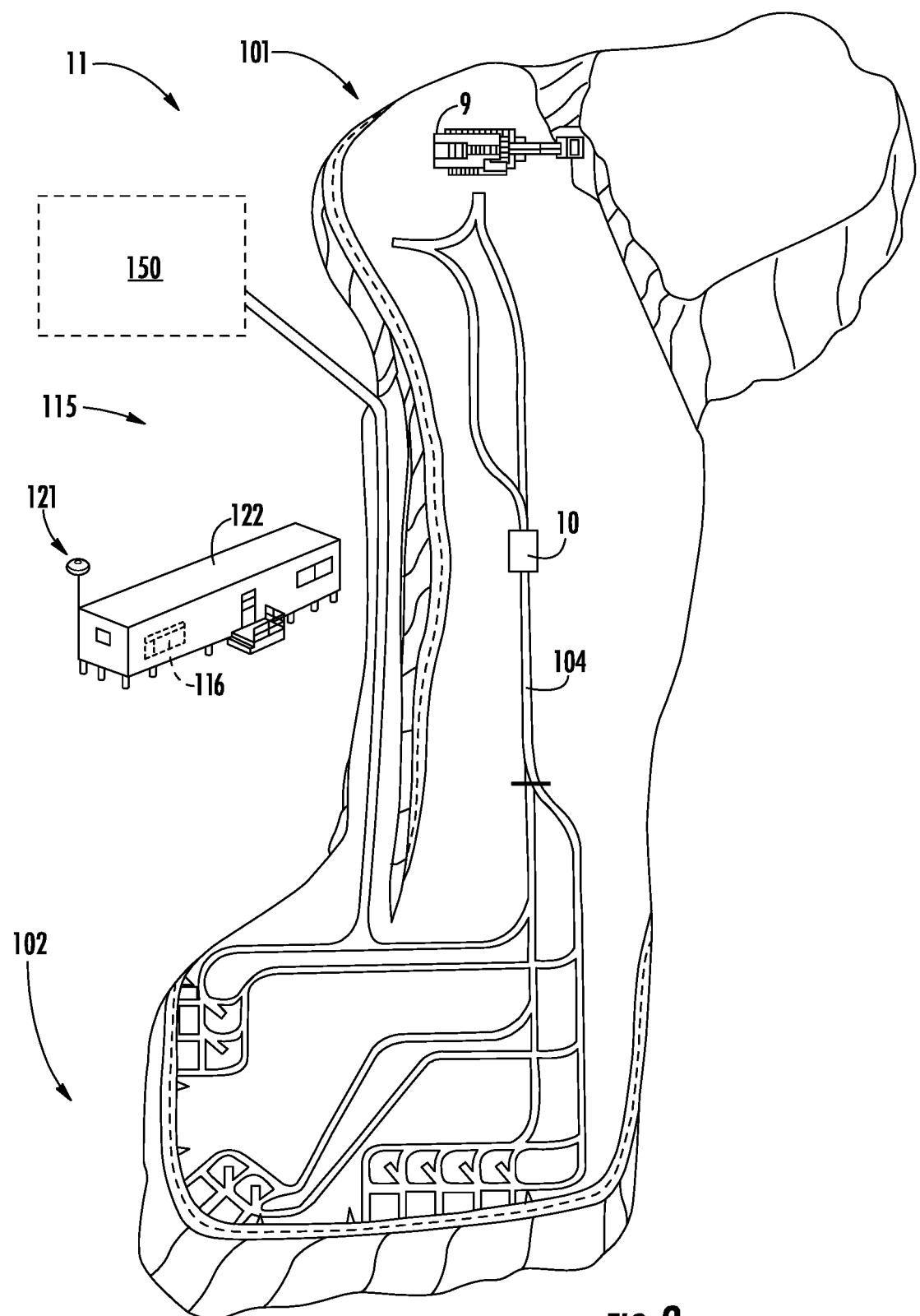
FIG. 2 is a pictorial illustration of an exemplary worksite in which the principles disclosed herein may be utilized.

This disclosure relates to the checkout and clearance of autonomous or semiautonomous machines for operation at an autonomous or semiautonomous worksite. FIG. 1 illustrates a machine 10 that includes an exemplary planner checkout system and procedure 12 that maybe utilized to clear an autonomous or semi-autonomously controlled machine 10 on a worksite 11. FIG. 2 illustrates a portion of an exemplary worksite 11 at which a plurality of mobile machines may operate to perform material moving operations. The exemplary work site 11 of FIG. 2 is presented as an example only, and is not intended to limit this disclosure. The worksite 11 may include, for example, a mine site, a landfill, a quarry, a construction site, a road worksite, or any other type of worksite. The machines may perform any of a plurality of desired operations at worksite 11, and such operations may require the machine to generally traverse the worksite 11.

In the exemplary worksite 11 of FIG. 2, one or more machines 10 may operate in an autonomous, a semiautonomous, or a manual manner to move material from one location at the worksite 11 to another location at the work site or to a further location at a location remote from the work site. The worksite 11 may include multiple locations designated for particular purposes. For example, a first location may be designated as a load location 101 at which one or more loading machines, such as an excavator 9 or other machine, operate to fill one or more haul trucks (machine 10) with material. A second location may be designated as a dump location 102 at which the machines 10 discharge or dump their payloads. The machines 10 may follow a main travel path 104 that generally extends between load location 101 and dump location 102.

A control system 115 indicated generally by an arrow in FIG. 2 associated with the worksite 11 may operate to control certain aspects of machine operation at the worksite 11 and also communicate information between the machines and between the machines and a back office or remote system. The control system 115 may be a stand-alone system or may include other systems including those within or associated with the various machines 10 such as the control systems of the machines described below Control system 115 may include components at the worksite 11 and may also include components located remotely from the work area. As a result, the functionality of control system 115 may be distributed so that certain functions are performed at the worksite 11 and other functions are performed remotely, such as at a remote operations center. The control system 115 may include a communications system including both a wireless communications system 121 at a command center 122 and a wired communications systems (not shown) for transmitting signals between components.

The control system 115 may include an electronic control module or controller 116 that may receive various input signals from wireless communications system 121, wired communications systems (not shown), control systems and sensors associated with machines 10, or from any other source. The control system 115 and controller 116 may control and provide input to the operation of various aspects of the worksite 11 including the specific tasks and operations performed by machines 10.

The controller 116 may be an electronic controller that operates in a logical fashion to perform operations, execute control algorithms, store and retrieve data and other desired operations. The controller 116 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 116 such as power supply circuitry, signal conditioning circuitry, driver circuitry, and other types of circuitry.

The controller 116 may be a single controller or may include more than one controller disposed to control various functions and/or features of the control system 115. For example, the controller 116 may include machine controllers 20 associated with machines 10. The term "controller" is meant to be used in its broadest sense to include one or more controllers and/or microprocessors that may be associated with the worksite 11 and/or the machines 10 and that may cooperate in controlling various functions and operations at the worksite and of the machines. The functionality of the controller 116 may be implemented in hardware and/or software without regard to the functionality. The controller 116 may rely on one or more data maps relating to the operating conditions and environment at the worksite 11 as well as characteristics and capabilities of the machines 10 that may be stored in the memory of controller. Each of these data maps may include a collection of data in the form of tables, graphs, and/or equations.

Returning to FIG. 1, machine 10 may embody an autonomous mobile machine. An "autonomous" machine refers to an unmanned machine that includes onboard and/or off-board computers, processors, and/or other electronic controllers which, based on input from various machine sensors, stored data, and control algorithms, provides outputs to control various machine systems such as steering, braking and propulsion to accomplish desired tasks. For example, an autonomous haul truck may include on-board systems that determine the position and heading of the machine, and control steering, propulsion, and braking to follow a route provided by an off-board path planner system (an exemplary planner checkout system and procedure of this disclosure is indicated generally as 400 in FIG. 4) and to avoid obstacles in the machine's path. Semiautonomous machines may provide some functions that are controlled by the onboard and off-board systems, while allowing an operator to control other functions. While the exemplary machine 10 illustrated in FIG. 1 is a haul truck, those of skill in the art will appreciate that the disclosed system and arrangements may likewise be utilized for other autonomous and semiautonomous machines. That is, the disclosed system and arrangements may be utilized in connection with, for example, an earth moving machine such as a wheel loader, a motor grader, a fluid delivery truck, or any other mobile machine known in the art. For the purposes of this disclosure, use of the term "autonomous machine" as utilized in the appended claims should be taken to include autonomous and semiautonomous machines.

Machine 10 may further include, among other things, a body 14 and a drive system (generally at 13) supported by one or more ground engaging drive mechanisms 16. The drive system 13 may include a prime mover 15 operatively connected to transmit power to the ground engaging drive mechanism 16 (e.g., front wheels) by way of an axle or other known means.

Prime mover 15 may include an engine such as, for example, a diesel engine, a gasoline engine, a gaseous fuel powered engine such as a natural gas engine, or any other type of engine apparent to one skilled in the art. Prime mover 15 may alternatively include a noncombustion source of power such as a fuel cell, a power storage device, an electric motor, or other similar mechanism. Prime mover 15 may be connected to the ground engaging drive mechanisms 16 via a direct mechanical coupling, an electric circuit, a hydraulic circuit, a transmission, or in any other suitable manner.

The machine 10 may include and be controlled by a machine control system 19 as shown generally by an arrow in FIG. 1 indicating association with the machine. The machine control system 19 may include an electronic control module or controller such as a machine controller 20 that controls the operation of various aspects of the machine 10 including the drivetrain and the hydraulic systems. The machine control system 19 and the machine controller 20 may be identical or similar in structure and operation to the control system 115 and the controller 116 of the work site, respectively, described above and their descriptions are not repeated herein. The machine control system 19 and the machine controller 20 may be located on the machine 10 and may also include components located remotely from the machine such as on any of the other machines 10 at the worksite 11 or at the command center 122. The functionality of machine controller 20 may be distributed so that certain functions are performed on the machine 10 and other functions are performed remotely. The operating characteristics and reference profile of the machine 10 may be stored within or accessed by the machine controller 20 or any other controller such as controller 116.

The machine 10 may be equipped with a plurality of machine sensors that provide data indicative (directly or indirectly) of machine pose including various operating characteristics of the machine (identified generally as machine pose sensor(s) 22) and/or the operating environment in which the machine is operating (identified generally as operating environment sensor(s) 18). The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

One or more sensors 18 may be mounted at different locations on the machine 10 in order to detect objects or environment. The objects detected by sensors 18 may include specific areas on worksite 11, for example, areas at which material is loaded and unloaded, geographical features of worksite 11, other autonomous or human-operator-controlled machines on the worksite, and any obstructions on the worksite. In an exemplary embodiment, machine 10 may be equipped with one or more short range sensors 18S, medium range sensors 18M, and/or long range sensors 18L located at different positions around body 14 of machine 10. Each of sensors 18 (S, M, L) may embody a device that detects the position, configuration, shape, and/or orientation of objects disposed within a sensing range of the sensors 18 (S, M, L). One or more sensors 18 (S, M, L) may include a LIDAR device, a RADAR device, a SONAR device, an IR or non-IR camera device, and/or any other sensing device known in the art. In one possible example, sensors 18 (S, M, L) may include an emitter that emits a detection beam and an associated receiver that receives a reflection of that detection beam. Based on characteristics of the reflected beam, a distance and a direction from an actual sensing location of sensors 18 (S, M, L) on machine 10 to a portion of the sensed object maybe determined. Sensors 18 (S, M, L) may then generate a position signal corresponding to the distance and direction, and communicate the position signal to at least one controller 20, 116. At least one controller 20, 116 may receive the position signal from sensors 18 (S, M, L) and, using a calibrated vehicle model, may operate machine 10 to avoid a collision with the sensed object. For example, at least one controller 20, 116 may steer machine 10 to the left or right to avoid an object that is detected by sensors 18 (S, M, L).

One or more machine sensors 22 may be mounted at different locations on machine 10, for detecting information regarding one or more characteristics of the machine 10, such as a load carried by machine 10, a maintenance state of machine 10, and/or a location of machine 10. In an exemplary embodiment, machine sensors 22 may include, for example, one or more of a speed sensor 24, a steering angle sensor 26, a load weight sensor 28, a load distribution sensor 30, an orientation sensor 32, and a location and heading sensor 34.

Speed sensor 24 may detect an actual ground or travel speed of machine 10 as it moves on worksite 11. The speed of machine 10 may be detected in a variety of ways. For example, speed sensor 24 may detect a number of revolutions over a given time period for a component of a ground engaging drive mechanism 16, such as a wheel hub, and either speed sensor 24, machine controller 20, or another processor may determine the speed of machine 10 using this information. In another embodiment, speed sensor 24 may measure an actual distance traveled by machine 10 over a given time period, and either speed sensor 24, at least one controller 20, 116, or another processor may determine the speed of machine 10 based on this information. Speed sensor 24 is not limited to a specific location on machine 10, however, and is not limited in the way that it detects the speed of machine 10. Other manners of determining the ground speed of the machine 10 are contemplated as would be understood by one skilled in the art.

Steering angle sensor 26 may detect an actual steering angle of machine 10. The steering angle may be detected in a variety of ways. For example, steering angle sensor 26 may sense a location, angle, and/or other characteristic of a component of a ground engaging drive mechanism 16, such as a wheel hub. In another embodiment, steering angle sensor 26 may sense a location, angle, and/or other characteristic of another component of machine 10, such as a rack and/or a pinion when machine 10 is turned by a rack-and-pinion steering system. In that case, a rotation angle of the pinion and/or a translation of the rack may be sensed, and either steering angle sensor 26, at least one controller 20, 116, or another processor may determine the steering angle of machine 10 using this information. Steering angle sensor 26 is not limited to a specific location on machine 10, however, and is not limited in the way that it detects the steering angle of machine 10.

Load weight sensor 28 may detect an actual weight of material being hauled by machine 10, in the event machine 10 is configured to haul material on worksite 11. The weight of the load carried by machine 10 may be detected in a variety of ways. For example, load weight sensor 28 may measure decreases in effective lengths of one or more springs supporting a dump box 36 of machine 10, and either load weight sensor 28, at least one controller 20, 116, or another processor may determine the weight of material hauled by machine 10 using this information. Load weight sensor 28 is not limited to a specific location on machine 10, however, and is not limited in the way that it detects the weight of material being hauled by machine 10.

Load distribution sensor 30 may detect an actual distribution of the weight of the material being hauled by machine 10. The distribution of the weight hauled by machine 10 may be detected in a variety of ways. For example, load distribution sensor 30 may measure decreases in effective lengths between or among groups of springs supporting dump box 36 of machine 10. By comparing lengths of springs on the front of dump box 36 to lengths of springs on the back of dump box 36, and/or to lengths of springs on the left or right side of dump box 36, either load distribution sensor 30, at least one controller 20, 116, or another processor may determine the distribution of the weight of the material hauled by machine 10 based on such comparisons. Load distribution sensor 30 is not limited to a specific location on machine 10, however, and is not limited in the way that it detects the distribution of weight of material being hauled by machine 10.

Orientation sensor 32 may determine an actual orientation of machine 10 on worksite 11. The orientation of machine 10 may include a roll of machine 10, which may be an angle measured about a roll axis that extends generally between a front and a back of machine 10, and/or may include a pitch of machine 10, which may be an angle measured about a pitch axis that extends generally between left and right sides of machine 10. Orientation sensor 32 may directly detect the orientation of machine 10 (e.g., detect the orientation of machine 10 relative to an artificial horizon), or may detect the orientation of an area on the ground that supports machine 10. Either orientation sensor 32, at least one controller 20, 116, or another processor may determine the orientation of machine 10 using this information. Orientation sensor 32 is not limited to a specific location on machine 10, however, and is not limited in the way that it detects the orientation of machine 10.

Location and heading sensor 34 may determine an actual geographical location and/or an actual heading of machine 10 on worksite 11. The location and heading of machine 10 may be detected in a variety of ways. For example, sensor 34 may utilize a positioning system, to determine various operating characteristics of the machine such as velocity, pitch rate, yaw rate, roll rate, etc. The positioning system may utilize Global Positioning System (GPS) data along with data from an Inertial Measurement Unit (IMU), which typically includes one or more yaw rate sensors such as gyroscopes, to calculate heading. In another embodiment, sensor 34 may include a local position detecting system that indicates the geographical location and/or heading of machine 10 relative to one or more transmitters on the worksite 11. Either sensor 34, at least one controller 20, 116, or another processor may determine the location of machine 10 and/or the actual heading of machine 10 based on this information. Sensor 34 is not limited to a specific location on machine 10, however, and is not limited in the way that it detects the location of machine 10.

The above-described sensors 22 may generate signals corresponding to the detected characteristics of machine 10, and may communicate the signals to at least one controller 20, 116. At least one controller 20, 116 may receive the signals from sensors 22 and enter information carried by one or more of the signals into, for example, a memory, a look-up table, a control map, and/or a control algorithm within machine 10 to maintain safe and efficient operation of machine 10 on worksite 11.

At least one controller 20, 116 may include components configured to monitor, record, condition, store, index, process, and/or communicate information received from sensors 18 and sensors 22. These components may include, for example, a memory, one or more data storage devices, one or more processors or central processing units, and/or any other components, including tangible, physical, and non-transitory components (hardware and software), which may be used to run the disclosed application. Furthermore, although aspects of the present disclosure may be described generally as being stored within a controller memory, one skilled in the art will appreciate that these aspects can be stored on or read from different types of computer program products or nontransitory and tangible computer-readable media such as computer chips and secondary storage devices, including hard disks, floppy disks, optical media, CD-ROM, or other forms of RAM or ROM. At least one controller 20, 116 may communicate with, receive information and/or instructions from, or other-wise be controlled by an automated worksite management system, such as Caterpillar Inc.'s MINESTAR SYSTEM™ or other similar systems.

At least one controller 20, 116 may cause machine 10 to autonomously follow a route generated by a path planner associated with worksite 11. A path planner associated with worksite 11 may include a worksite management system 38 which may generate a planner checkout route and plan, or a calibration route and plan. Machine 10 autonomously follow the route recommended route by relying on data input from one or more sensors 18, 22.

When a machine 10 is initially introduced at a worksite 11 or is reintroduced at a worksite 11 after undergoing service, the machine 10 must undergo a planner checkout process to confirm that the individual machine components conform to the basic requirements expected by the planner system. That is, the machine 10 is driven autonomously on a known course with known curves and length in order to collect data to provide an accurate representation of whether the machine 10 is operating as expected. A dedicated course onsite may be expensive and may require a space not available at a worksite 11.

Figure 3:
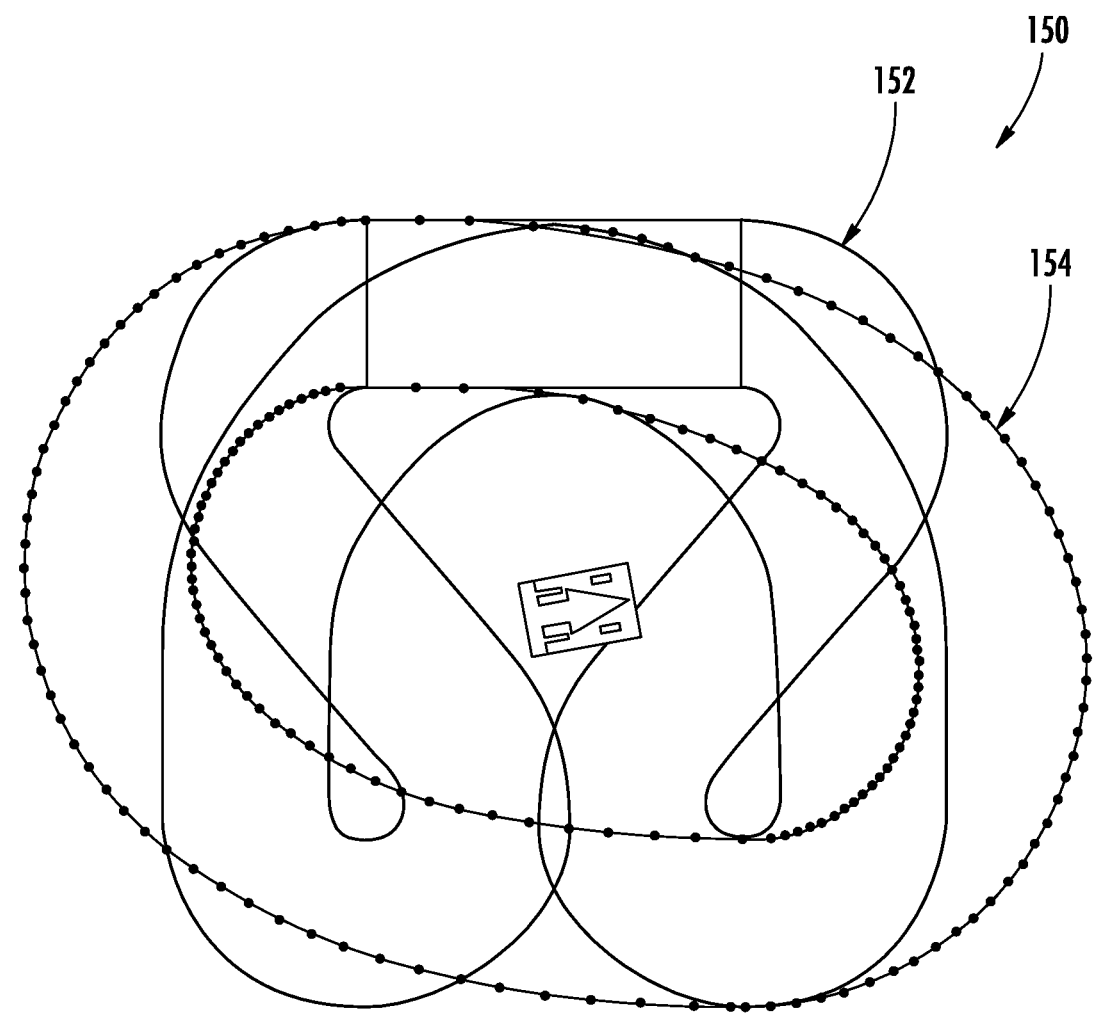
FIG. 3 is an enlarged schematic view of an offline portion of the exemplary worksite of FIG. 2.
Figure 4:
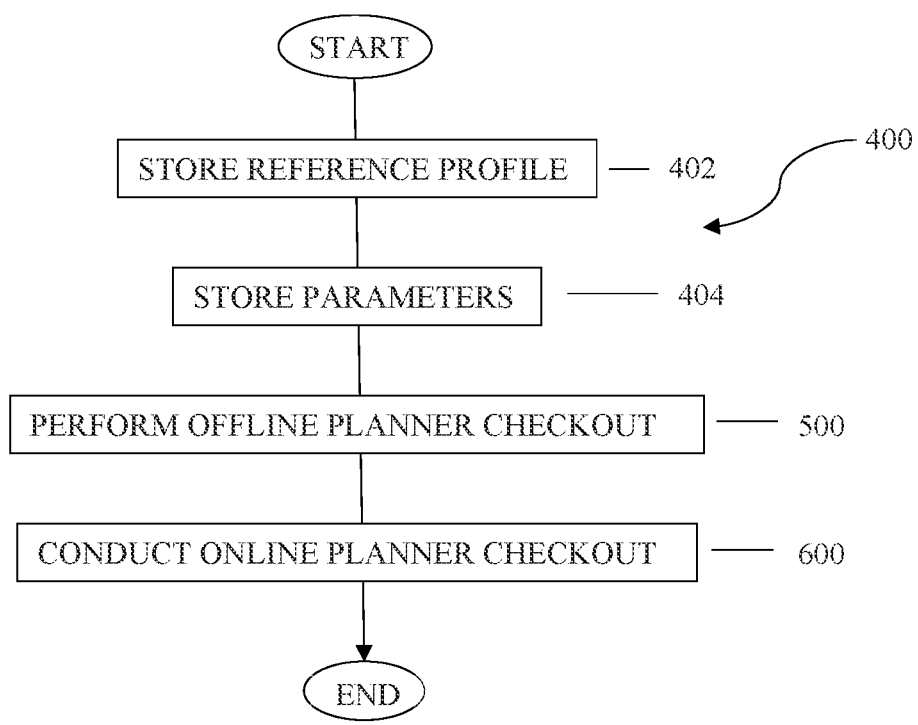
FIG. 4 is a flow chart illustrating an exemplary planner checkout system and procedure for the machine of FIG. 1.

In order to address this challenge, the planner checkout process includes an offline planner checkout system and an online planner checkout system (see FIGS. 4-6, explained in greater detail in the Industrial Applicability section of this disclosure). The planner checkout process disclosed herein first utilizes an offline location 150 in an offline planner checkout system and procedure to evaluate the operation of the machine 10 in response to instructions based upon an onboard planner. An exemplary representation of an offline location 150 is illustrated in FIG. 3. The offline location 150 includes a high curvature pattern 152 with a plurality of predetermined curves and, optionally, a mini oval track 154. Those of skill in the art will appreciate that the offline location 150 may be relatively small in comparison to the worksite 11. While the offline location 150 may be disposed at a location separate from the worksite 11, in some embodiments, the offline location 150 may be located within a worksite 11 or immediately adjacent a worksite 11. In at least some embodiments, the offline location 150 is located in close proximity to the worksite 11.

In the course of the offline planner checkout procedure, the machine 10 is operated at a relatively slow base speed on the high curvature pattern 152, that is, the machine 10 is operated at a speed that is less than the expected maximum designated operating speed of the machine 10 within the worksite 11. In at least one embodiment, the slow base speed is on the order of 30 kph. During the course of the offline planner checkout procedure, various actual offline operating characteristics of the machine 10 are compared with offline planner checkout operational parameters to determine if the actual offline operating characteristics of the machine 10 fall within applicable predetermined offline parameter thresholds of the operational parameters or an acceptable offline deviation thereof. For example, based upon data that may be gathered from all or a position of the sensors 18, 22, the offline planner checkout system and procedure may evaluate slow speed steering, including the accuracy and ability to steer at a given speed, as well as braking, that is the ability of the machine 10 to stop in an expected distance. Utilizing the mini oval track 154, the offline planner checkout system and procedure may evaluate braking ability at a slightly higher speed. In at least one embodiment, the speed utilized on the mini oval track 154 is on the order of 48 kph. The maximum speed at which the machine 10 performs acceptably offline is identified as the checked out offline speed.

Once the machine 10 passes the offline planner checkout, the machine 10 moves into service online at the worksite 11, operating at no greater than the checkout speed, i.e., the speed at which the machine 10 passes the offline planner checkout. When operated online, the machine 10 is periodically reviewed to determine if the actual online operating characteristics of the machine 10 are within the applicable predetermined offline parameter thresholds of machine operational parameters or an acceptable online deviation therefrom. For example, based upon data that may be gathered from all or a position of the sensors 18, 22, the online planner checkout system and procedure may evaluate increased speed steering, machine tracking, and braking.

When all of the online operational parameters have been satisfied or the machine 10 is determined to operating within an acceptable online deviation of the predetermined online parameter thresholds, the online operating speed of the machine 10 is increased incrementally, that is, by a preset interval. In at least one embodiment, for example, the online operating speed is increased by 7 kph. During continued online operation, the machine 10 is again periodically reviewed to again determine if the actual machine online operating characteristics are within the applicable machine predetermined online parameter thresholds or an acceptable online deviation therefrom at the increased speed. Again, when all of the online operational parameters have been satisfied or the machine is determined to be operating within an acceptable online deviation of all of the online operational parameters, the online operating speed of the machine 10 is again increased incrementally. This process continues until the machine 10 is determined to be operating at the maximum designated online operating speed. Conversely, if, during any of the online planner checkout process, the actual online machine operating characteristics are determined to not be within the applicable predetermined online parameter thresholds of or an acceptable online deviation therefrom at any time during this process, the machine 10 is operated at the last speed at which the machine 10 was operating within the applicable predetermined online parameter thresholds or acceptable online deviations thereof, that is, the last checked out speed. Additionally, a message may be generated by the at least one controller 20, 116 to the command center 122 identifying the unacceptable online deviation and indicating that the machine 10 is not operating as expected and needs to be diagnosed by further evaluation the relevant parameters.

INDUSTRIAL APPLICABILITY

The industrial applicability of the systems described herein will be readily appreciated from the forgoing discussion. The foregoing discussion is applicable to systems used with machines 10 such as haul trucks or other machines that require a relatively large area for conducting planner checkout. Work sites that may benefit from the disclosed planner checkout may include a mining site, a landfill, a quarry, a construction site, a roadwork site, or any other area wherein the machine operates over a broad area.

Exemplary systems and methods according to the present disclosure are graphically illustrated in the flowcharts of FIGS. 4-6. Referring first to FIG. 4, prior to introduction of a machine 10 or reintroduction of a repaired machine 10 at the worksite 11, a planner checkout procedure is required. While the discussion of FIGS. 4-6 refers to the operation of the at least one controller 20, 116, those of skill in the art will appreciate that an alternate controller may likewise be utilized, in whole or in part, as a part of the overall control system 115. Prior to conducting the planner checkout, the reference profile for the machine 10 and the applicable machine operational parameters are stored within at least one controller 20, 116 at stages 402 and 404, respectively. The applicable machine operational parameters may include model operating characteristics that should result based upon machine operating commands, such as, for example, speed, braking response and distances for various speeds, the ability to and curvature resulting from steering at various speeds, independent drift, crosstracking, etc. The applicable machine operational parameters may include predetermined thresholds of variability permissible for such operating characteristics that ideally result from various machine operating commands. At stage 500, an offline planner checkout is conducted at offline location 150; an exemplary offline planner checkout procedure is illustrated in the flowchart of FIG. 5. Following successful clearance of the offline planner checkout at stage 500, the machine 10 is placed into service online and an online planner checkout is conducted at stage 600; an exemplary offline planner checkout procedure is illustrated in the flowchart of FIG. 6.

Turning to FIG. 5, an exemplary offline planner checkout system and procedure are illustrated. In order to conduct the offline planner checkout, the machine 10 is operated offline at a location such as 150 in FIGS. 2 and 3 (stage 502). The machine 10 is operated at the offline location 150 at an offline operating speed about the predetermined curves of the high curvature pattern 152, and, optionally, about the mini oval track 154. Those of skill in the art will appreciate that the machine 10 may be operated at a somewhat higher speed when operating on the on the mini oval track 154 than when operating on the high curvature pattern 152.

At stage 504, the at least one controller 20, 116 accesses the applicable predetermined offline parameter threshold(s) for comparison with machine actual offline operating characteristic(s). At stage 506, the at least one controller 20, 116 determines the actual offline operating characteristic(s) of the machine 10 based upon measurements from one or more of the sensors 18, 22.

In the offline planner checkout, the actual offline operating characteristics may be determined during the course of, for example, one or more of stopping tests and steering tests. For example, during steering tests, the operation of the machine 10 may be evaluated to determine steering latency, the relationship between the commanded curvature and the resultant state-feedback curvature and the relationship between state-feedback curvature and resultant curvature on the ground, steer bias, obedience to commanded curvature, and slew rate, that is, that a large change in commanded curvature will result in changing the steering angle at the expected rate. By way of further example, during stopping tests, the operation of the machine 10 may be evaluated to determine whether the machine 10 is able to hit a targeted stopping location accurately, initially and repeatedly, that the machine 10 follows commanded deceleration and acceleration, including maximum deceleration, and that stopping latency is within the thresholds of nominal value or an acceptable offline deviation therefrom. Additionally, steering and/or stopping tests may be utilized to assist in a determination of whether the modeling prediction itself is accurate. It will be appreciated that, in some embodiments, one or more of the applicable parameter threshold may be addressed simultaneously and in some embodiments applicable parameter thresholds may be addressed sequentially.

Returning to FIG. 5, at stage 508, the at least one controller 20, 116 compares the machine actual offline operating characteristic(s) with the applicable predetermined offline parameter threshold(s) to determine if the actual offline operating characteristic(s) are within the applicable parameter threshold(s) or within an acceptable offline deviation therefrom. If it is determined at stage 508 that the actual machine operating characteristic(s) are not within an acceptable offline deviation of the applicable predetermined offline parameter threshold(s), it is then determined at stage 514 whether the unacceptable offline deviation is due to bad calibration. If the deviation is not due to bad calibration, the machine 10 is identified as including a defect and is removed from operation (stage 516). The machine 10 may then be serviced as necessary.

Conversely, if the deviation is due to bad calibration (stage 514), the machine control system 19 is then calibrated by any known or appropriate method (stage 518). The method of calibration may be, by way of example only, as disclosed in U.S. Pat. Nos. 9,008,886 and 9,182,760 to Braunstein et al., or any other appropriate method. Once the machine 10 has been recalibrated (stage 518), the machine 10 is again operated at the offline location 150 at an offline operating speed (stage 502), and the at least one controller 20, 116 again conducts the offline planner checkout system and procedure described above.

If the actual offline operating characteristic(s) are within the applicable parameter threshold(s) or an acceptable offline deviation thereof (stage 508), the at least one controller 20, 116 determines whether all of the applicable operational parameters for the offline planner checkout have been satisfied or cleared (stage 510). If all of the applicable parameters for offline planner checkout have been satisfied, the machine 10 is placed into service online at the checked out offline speed (stage 512), the checked out offline speed being the speed at which the machine 10 has satisfied the requirements of the offline planner checkout.

If all of the applicable operational parameters for offline planner checkout have not been satisfied (stage 510), the machine 10 continues to be operated offline, returning to stage 502. The offline planner checkout continues the comparison (stage 508) of the applicable predetermined offline parameter thresholds (stage 504) with the actual machine offline operating characteristics (stage 506) until such time as all actual machine operating characteristics required for offline checkout are within the applicable predetermined offline parameter thresholds or an acceptable offline deviation thereof (stages 508 and 510). Once all of the applicable operational parameters for offline planner checkout have been satisfied, the machine 10 is placed into service online at the checked out offline speed (stage 512), the checked out offline speed being the speed at which the machine 10 has satisfied the requirements of the offline planner checkout.

Turning now to the flow chart of FIG. 6, an exemplary online checkout system and procedure 600 is illustrated. In order to conduct the online planner checkout 602, the machine 10 is operated online at the worksite 11, which may expose the machine 10 to curvatures not experienced at the offline location 150. While, in the illustrated embodiment, the machine 10 is first operated online at the checked out offline speed determined in the offline planner checkout (stage 512), those of skill in the art will appreciate that alternate embodiments may increase the online operating speed by a predetermined interval with introduction of the machine 10 online at the worksite 11.

At stage 604, the at least one controller 20, 116 accesses the applicable predetermined online parameter threshold(s) for comparison with machine actual online operating characteristic(s). At stage 606, the at least one controller 20, 116 determines the actual online operating characteristic(s) of the machine 10 based upon measurements from one or more of the sensors 18, 22.

In the online planner checkout, the actual online operating characteristics may be determined during the course of, for example, one or more of stopping tests and steering tests as explained above, in whole or in part, as well as tracking test(s). During tracking tests, for example, the operation of the machine 10 may be evaluated to ensure that the machine 10 is able to track a path with minimal cross-track error or heading error, and without oscillatory behavior. Those of skill in the art will appreciate that the steering, stopping, and tracking tests may ultimately be conducted at or from higher speeds when the machine 10 operates at a worksite 11.

Returning to FIG. 6, at stage 608, the at least one controller 20, 116 compares the applicable predetermined online parameter threshold(s) with the machine actual online operating characteristic(s) to determine if the actual online operating characteristic(s) are within the applicable predetermined online parameter threshold(s) or within an acceptable online deviation thereof. If the actual online operating characteristic(s) are not within the applicable predetermined online parameter threshold(s) or within an acceptable online deviation thereof, the machine 10 continues to be operated online at the last online operating speed at which all actual online operating characteristic(s) have been determined to be within the applicable predetermined online parameter threshold(s) or an acceptable online deviation thereof, that is, the last checked out speed (stage 610). The at least one controller 20, 116 may additionally identify the deviation that is not considered acceptable to the command center 122.

Conversely, if, at stage 608, the actual operating characteristic(s) reviewed are within the applicable predetermined online parameter threshold(s) or an acceptable online deviation thereof, the at least one controller 20, 116 determines whether all of the applicable operational parameters for the online planner checkout have been satisfied (stage 612). If all of the applicable parameters for online planner checkout have not been satisfied, the machine 10 continues to be operated online at that same online operating speed (stage 614), again accessing applicable predetermined online parameter threshold(s) (stage 604), determining actual machine online operating characteristic(s) (stage 606), and making a comparison to determine whether the actual machine online operating characteristic(s) is/are within the applicable predetermined online parameter threshold(s) or an acceptable online deviation thereof (stage 608). If they are not, the machine 10 is operated online at the last speed at which all actual operating characteristic(s) have been determined to be within or an acceptable online deviation of the applicable parameter threshold(s), that is, the last checked out speed (stage 610). In at least one embodiment, an additional message may be generated by the at least one controller 20, 116 to the command center 122, identifying the unacceptable online deviation and indicating that the machine 10 is not operating as expected and needs to be diagnosed by further evaluation the relevant operational parameters (stage 611). Conversely, if, at stage 608, the actual online operating characteristic(s) reviewed are within the applicable predetermined online parameter threshold(s) or an acceptable online deviation thereof, the at least one controller 20, 116 determines whether all of the applicable operational parameters for the online planner checkout have been satisfied (stage 612), and this process continues until such time as all operational parameters have been cleared.

Once it is determined that all parameters have been cleared (stage 612), the speed at which the machine 10 is operating is designated as the checked out online speed. At stage 616, the at least one controller 20, 116 determines whether the machine 10 is operating at a maximum designated operating speed for the model of the machine 10 by, for example, comparing the actual machine ground speed with the reference profile for the machine 10 stored at stage 402. If the machine is not operating at the maximum designated operating speed at stage 616, the speed of the machine 10 is increased by a preset interval (stage 618). By way of example only, the speed of the machine 10 be increased by 7 kph in at least one embodiment. At the increased speed, the machine 10 continues to be operated on line (stage 614). At this increased speed, the at least one controller 20, 116 accesses the applicable machine predetermined online parameter threshold(s) (stage 604), determines the actual online operating characteristic(s) based upon the readings of one or more of the sensors 18, 22 (stage 606), and determines whether the actual online operating characteristic(s) are within the applicable predetermined online parameter threshold(s) or an acceptable online deviation thereof (stage 608). This process continues as explained above until it is determined at stage 608 that one or more of the machine online operating characteristics are not within an acceptable online deviation of the applicable predetermined online parameter threshold(s) and the machine is operated online at the last fully checked out online speed (stage 610), or all of the identified operational parameters have been cleared at this increased speed (stage 612). If all identified operational parameters have been cleared at this increased speed (stage 612), the incrementally increased speed is identified as the new checked out online speed.

When all of the applicable operational parameters for online planner checkout have been satisfied at the incrementally increased speed (stage 612), the at least one controller 20, 116 again determines if the machine is operating at the maximum designated operating speed (stage 616). If the machine 10 is not operating at the maximum designated operating speed, the speed is again increased by a preset interval at stage 618, and the machine 10 is operated online (stage 614). At this again increased speed, the at least one controller 20, 116 accesses the applicable machine predetermined online parameter threshold(s) (stage 604), determines the actual machine online operating characteristic(s) based upon the readings of one or more of the sensors 18, 22 (stage 606), and determines whether the actual machine online operating characteristic(s) are within the applicable predetermined online parameter threshold(s) or an acceptable online deviation thereof (stage 608). This process continues as explained above until it is determined at stage 608 that one or more of the machine online operating characteristics are not within an acceptable online deviation of the applicable predetermined online parameter threshold(s) and the machine is operated online at the last fully checked out online speed (stage 610), or all of the identified operational parameters for the online planner checkout procedure have been cleared at this increased speed (stage 612). If all identified operational parameters have been cleared at this increased speed (stage 612), the twice incrementally increased speed is identified as the new checked out online speed.

This process continues, increasing the speed of the machine 10 by preset intervals (stage 618) until all of the applicable operational parameters for online planner checkout have been satisfied (stage 612) for the machine 10 operating at the maximum designated operating speed (stage 616). If the machine 10 is operating at the maximum designated operating speed (stage 616), the machine 10 continues to be operated online at the maximum designated operating speed (stage 620) and the online checkout is complete.

It will be appreciated by those of skill in the art that if, at any time during the offline or online planner checkout procedures 500, 600, the machine 10 is shut down, the current state of the offline or online planner checkout procedures 500, 600 may be stored in the at least one controller 20, 116. In this way, the machine controller 20 may control the machine 10 to continue with the offline or online planner checkout procedure 500, 600 when the machine 10 is again placed into service.

Use of the disclosed system and procedures 400, 500, 600 may provide numerous advantages to operators and/or managers of worksite 11. Inasmuch as minimal space is required for the offline planner checkout 500, the offline location 150 may be created at or near the worksite 11, eliminating the need for a full scale test track at a worksite 11, or the transport of the machine 10 to an offsite testing track. Those of skill in the art will further appreciate that, while the machine 10 may not be operating online at full speed during the online planner checkout procedure 600, at least some measure of productivity is gained as a result of online operation of the machine 10. That is, while the machine 10 may not operate at full productivity when placed into service online, it is providing at least some productivity.

It will be apparent to those skilled in the art that various modifications and variations can be made to the planner check systems and procedures of the present disclosure. Other embodiments of the described methods and systems will be apparent to those skilled in the art from consideration of the disclosure herein. It is intended that the specification and examples of this disclosure be considered as exemplary only, with a true scope of the disclosure being indicated by the following claims and their equivalents. It is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A system for clearing a machine for at least one of autonomous operation and semi autonomous operation at an autonomous worksite, comprising:
    an offline location including a plurality of predetermined curves, the offline location not including the autonomous worksite;
    at least one sensor configured to measure at least two operating characteristics of the machine, the at least two operating characteristics including at least an offline operating characteristic and an online operating characteristic; and
    a control system including at least one controller, the at least one controller being configured to:
        store a reference profile for the machine;
        store operational parameters based upon the reference profile, the operational parameters including at least one predetermined offline parameter threshold and at least one predetermined online parameter threshold;
        access the at least two operating characteristics of the machine from the at least one sensor;
        conduct an offline planner checkout procedure at the offline location, including the controller further being configured to:
            operate the machine at the offline location at a plurality of offline operating speeds;
            determine whether the at least one offline operating characteristic is within the at least one predetermined offline parameter threshold or an acceptable offline deviation therefrom during operation of the machine at one of the offline operating speeds; and
            when the offline operating characteristic is within the predetermined offline parameter threshold or the acceptable offline deviation therefrom, identify, the one offline operating speed as a checked out offline speed, the checked out offline speed being a maximum operating speed for the offline planner checkout procedure from among the plurality of offline operating speeds of the machine during the offline planner checkout procedure;
        conduct an online planner checkout procedure at the autonomous worksite after identification of the checked out offline speed, including the controller further being configured to:
            operate the machine at the autonomous worksite at an online operating speed, the online operating speed for the online planner checkout procedure being greater than the checked out offline speed;
            determine whether the at least one online operating characteristic is within the at least one predetermined online parameter threshold or an acceptable online deviation therefrom during operation of the machine at the online operating speed; and
            when the online operating characteristic is not within the at least one predetermined online parameter threshold or an acceptable online deviation therefrom during the operation of the machine at the online operating speed, operate the machine at the autonomous worksite at the checked out offline speed;
            when the at least one online operating characteristic is within the predetermined online parameter threshold or the acceptable online deviation therefrom during the operation of the machine at the online operating speed,
                identify the online operating speed as a checked out online speed;
                determine whether the machine is operating at a maximum designated operating speed; and
                when the machine is not operating at the maximum designated operating speed, increase the online operating speed of the machine by a preset interval and repeat the online planner checkout procedure, designating an increased online operating speed as the online operating speed,
            wherein the at least one offline operating characteristic includes at least two offline operating characteristics, one of which being a braking ability of the machine, the checked out offline speed being associated with the offline planner checkout procedure checking the braking ability at the checked out offline speed.

2. The system of claim 1 wherein:
    in connection with the offline planner checkout procedure, the controller is further configured to:
        determine the offline operating characteristic from the at least one sensor; and access the at least one predetermined offline parameter threshold corresponding to the offline operating characteristic; and
    in connection with the online planner checkout procedure, the controller is further configured to:
        determine the online operating characteristic from the at least one sensor;
        access the at least one predetermined online parameter threshold corresponding to the online operating characteristic;
        when the online operating characteristic is within the predetermined online parameter threshold or the acceptable online deviation therefrom during the operation of the machine at the online operating speed, and when the machine is operating at the maximum designated operating speed, end the online planner checkout procedure and continue to operate the machine at the autonomous worksite at the maximum designated operating speed.

3. The system of claim 1 wherein the at least one sensor includes at least one of a machine pose sensor and an operating environment sensor.

4. The system of claim 1 wherein the checked out offline speed is the same as an initial online operating speed for the machine for the online planner checkout procedure.

5. The system of claim 1 wherein the at least one controller is further configured to determine whether an unacceptable offline deviation greater from the predetermined offline parameter threshold is a result of bad calibration of the machine.

6. The system of claim 5 wherein the at least one controller is configured to either calibrate the machine when the unacceptable offline deviation is the result of bad calibration of the machine.

7. The system of claim 5 wherein the at least one controller is configured to remove the machine from operation when the unacceptable offline deviation is not the result of bad calibration.

8. The system of claim 1 wherein the at least one controller is configured to determine whether a plurality of online operating characteristics are within a plurality of predetermined online parameter thresholds or acceptable online deviations thereof during the operation of the machine at the online operating speed before increasing the online operating speed by the preset interval.

9. The system of claim 1 wherein the at least two operating characteristics of the machine include machine ground speed and machine braking response.

10. The system of claim 1 wherein the at least two operating characteristics of the machine include at least three operating characteristics, the at least three operating characteristics including machine ground speed, machine braking response, and machine tracking.

11. The system of claim 1 wherein the at least one controller is configured to store at least one of a current state of the offline planner checkout procedure and a current state of the online planner checkout procedure.

12. A method of clearing a machine for at least one of autonomous operation and semi autonomous operation at an autonomous worksite, the method comprising:
  conducting an offline planner checkout procedure, including:
    operating the machine at an offline location at an offline operating speed, the offline location including a plurality of predetermined curves, the offline location not including the autonomous worksite;
    determining at least one offline operating characteristic of the machine from at least one sensor;
    determining whether the at least one offline operating characteristic is within a predetermined offline parameter threshold or an acceptable offline deviation therefrom for the operation of the machine at the offline operating speed; and
    responsive to the at least one offline operating characteristic being within the predetermined offline parameter threshold or the acceptable offline deviation therefrom for the operation of the machine at the offline operating speed, identifying the offline operating speed as a checked out offline speed, the checked out offline speed being a maximum operating speed for the offline planner checkout procedure from among a plurality of offline operating speeds of the machine, including said offline operating speed, during the offline planner checkout procedure; and
  conducting an online planner checkout procedure at the autonomous worksite after said identifying the checked out offline speed, said conducting the online planner checkout procedure including:
    operating the machine at the autonomous worksite at an online operating speed, the online operating speed for the online planner checkout procedure being greater than the checked out offline speed;
    determining at least one online operating characteristic of the machine from the at least one sensor;
    accessing at least one online operational parameter corresponding to the at least one online operating characteristic of the machine during operation of the machine at the online operating speed;
    determining whether the at least one online operating characteristic is within a predetermined online parameter threshold or an acceptable online deviation therefrom for the operation of the machine at the online operating speed; and
    responsive to the at least one online operating characteristic not being within the predetermined online parameter threshold or the acceptable online deviation therefrom for the operation of the machine at the online operating speed, operating the machine at the autonomous worksite at the checked out offline speed;
    responsive to the at least one online operating characteristic being within the predetermined online parameter threshold or the acceptable online deviation therefrom for the operation of the machine at the online operating speed,
      identifying the online operating speed as a checked out online speed;
      determining whether the machine is operating at a maximum designated operating speed;
      when the machine is operating at the maximum designated operating speed, ending the online planner checkout procedure and continuing to operate the machine at the autonomous worksite at the maximum designated operating speed; and
      when the machine is not operating at the maximum designated operating speed, increasing the online operating speed of the machine by a preset interval and repeating the online planner checkout procedure, designating an increased online operating speed as the online operating speed,
  wherein the at least one offline operating characteristic includes at least two offline operating characteristics, one of which being a braking ability of the machine, the checked out offline speed being associated with the offline planner checkout procedure checking the braking ability at the checked out offline speed.

13. The method of claim 12 wherein the checked out offline speed is the same as an initial online operating speed for the machine for the online planner checkout procedure.

14. The method of claim 12 further including determining whether an unacceptable offline deviation greater from the predetermined offline parameter threshold is a result of bad calibration of the machine.

15. The method of claim 14 further including at least one of calibrating the machine responsive to the unacceptable offline deviation being the result of bad calibration, and removing the machine from operation responsive to the unacceptable offline deviation not being the result of bad calibration.

16. The method of claim 12 further including generating a message to command center indicating that the machine is not operating as expected responsive to the at least one online operating characteristic not being within the predetermined online parameter threshold or the acceptable online deviation therefrom.

17. The method of claim 12 wherein said determining whether the at least one offline operating characteristic is within the predetermined offline parameter threshold or an acceptable offline deviation therefrom includes determining whether machine ground speed and braking response are within the predetermined offline parameter threshold or within the acceptable offline deviation therefrom, and wherein said determining whether the at least one online operating characteristic is within the predetermined online parameter threshold or an acceptable online deviation therefrom includes determining whether the machine ground speed and braking response are within the predetermined online parameter threshold or within the acceptable online deviation therefrom.

18. The method of claim 17 wherein said determining whether the at least one online operating characteristic is within the predetermined online parameter threshold or an acceptable online deviation therefrom includes determining whether machine tracking is within the predetermined online parameter threshold or within the acceptable online deviation therefrom.

19. The method of claim 12 further including storing at least one of a current state of the offline planner checkout procedure and a current state of the online planner checkout procedure.

20. A machine comprising:
a body;
a drive system including a prime mover operatively connected to at least one ground engaging drive mechanism;
at least one pose sensor disposed to provide data indicative of machine pose;
a machine control system including at least one controller, the at least one controller being configured to:
store operational parameters based upon a reference profile for the machine;
conduct an offline planner checkout procedure at an offline location, including the controller being configured to:
operate the machine at an offline operating speed at the offline location, which includes a plurality of predetermined curves;
determine at least one offline operating characteristic of the machine from the at least one pose sensor;
access at least one offline operational parameter corresponding to the at least one offline operating characteristic of the machine;
determine whether the at least one offline operating characteristic is within a predetermined offline parameter threshold or an acceptable offline deviation therefrom for the operation of the machine at the offline operating speed; and
responsive to the at least one offline operating characteristic being determined to be within the predetermined offline parameter threshold or the acceptable offline deviation therefrom, identify the offline operating speed as a checked out offline speed;
conduct an online planner checkout procedure at an autonomous worksite different from the offline location after identification of the checked out offline speed, including the controller being configured to:
operate the machine at the autonomous worksite at an online operating speed, the online operating speed for the online planner checkout procedure being greater than or equal to the checked out offline speed;
determine at least one online operating characteristic of the machine from the at least one sensor;
access at least one online operational parameter corresponding to the at least one online operating characteristic of the machine;
determine whether the at least one online operating characteristic is within a predetermined online parameter threshold or an acceptable online deviation therefrom for the operation of the machine at the online operating speed; and
responsive to the at least one online operating characteristic not being determined to be within the predetermined online parameter threshold or the acceptable online deviation therefrom for the operation of the machine at the online operating speed, operate the machine at the autonomous worksite at the checked out offline speed;
responsive to the at least one operating characteristic being determined to be within the predetermined online parameter threshold or the acceptable online deviation therefrom for the operation of the machine at the online operating speed,
identify the online operating speed as a checked out online speed;
determine whether the machine is operating at a maximum designated operating speed;
responsive to the machine being determined to be operating at the maximum designated operating speed, end the online planner checkout procedure and continue to operate the machine at the autonomous worksite at the maximum designated operating speed; and
responsive to the machine not being determined to be operating at the maximum designated operating speed, increase the online operating speed of the machine by a preset interval and repeat the online planner checkout procedure, designating an increased online operating speed as the online operating speed,
wherein the at least one offline operating characteristic includes at least two offline operating characteristics, one of which being a braking ability of the machine, the checked out offline speed being associated with the offline planner checkout procedure checking the braking ability at the checked out offline speed, the checked out offline speed associated with checking the braking ability being greater than an offline speed associated with each other operating characteristics of the at least two offline operating characteristics for the offline planner checkout procedure.

* * * * *